United States Patent [19]

Tracy

[11] 4,261,912
[45] Apr. 14, 1981

[54] ESTER OF ω,ω-BIS(DIALKYLHYDROXYPHENYL) ALKANOLS AS EFFECTIVE ANTIOXIDANTS

[75] Inventor: David J. Tracy, Lincoln Park, N.J.

[73] Assignee: GAF Corporation, New York, N.Y.

[21] Appl. No.: 62,761

[22] Filed: Aug. 1, 1979

[51] Int. Cl.³ .............. C07L 69/88; C09F 5/08; C07C 69/76
[52] U.S. Cl. .............. 260/410.5; 560/72; 560/107; 560/193; 560/194; 260/45.85 R; 568/723; 568/726; 560/85
[58] Field of Search .............. 560/72, 107, 85, 194, 560/193; 260/410.5, 45.85

[56] References Cited

U.S. PATENT DOCUMENTS 4,173,541  11/1979  Molt .............................. 560/72

FOREIGN PATENT DOCUMENTS 693410   9/1964  Canada ........................... 260/473 S
6803498  9/1965  Netherlands .................... 260/473 S
1094532  12/1967  United Kingdom ............. 260/473 S Primary Examiner—Paul J. Killos
Attorney, Agent, or Firm—James Magee, Jr.; Walter Katz

[57] ABSTRACT

This invention describes novel antioxidant compounds which are esters of ω,ω-bis(dialkylhydroxyphenyl) alkanols having the formula:

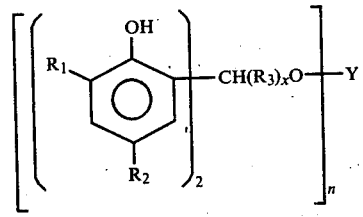

wherein
$R_1$ is a tertiary alkyl group having 4–8 carbon atoms;
$R_2$ is alkyl having 1–4 carbon atoms;
$R_3$ is a straight chain or branched alkylene group having 1–4 carbon atoms;
x is 1–4,
n is 1 or 2, and,
Y is a group of the formulas

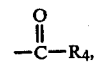

when n is 1, where $R_4$ is alkyl having from 12 to 24 carbon atoms, phenyl, or phenyl substituted with hydroxy of alkyl having 1 to 4 carbon atoms, or combinations thereof, or

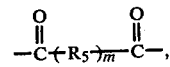

when n is 2, where $R_5$ is a direct bond, a straight chain or branched alkylene having 1 to 8 carbon atoms, or a phenylene group, and m is 0 to 4.

39 Claims, No Drawings

ESTER OF ω,ω-BIS(DIALKYLHYDROXYPHENYL) ALKANOLS AS EFFECTIVE ANTIOXIDANTS

BACKGROUND OF THE INVENTION

1. Field of the Invention

This invention relates to antioxidants, and more particularly, to new compounds, the method of making them, their use for stabilizing organic material against thermo-oxidative degradation and the organic material stabilized with their aid.

2. Description of the Prior Art

It is known to employ derivatives of sterically hindered phenols as stabilizers for plastics against thermo-oxidative degradation or degradation induced by light. However, many of these compounds do not afford long life protection against these degradative effects, and others exhibit the disadvantage that they discolor the organic polymer in an objectionable manner either when they are incorporaed or under the action of light or on contact with industrial flue gases or even on contact with hot water, greatly limits their applicability in industry. Now new compounds have been found which, surprisingly, are outstandingly suitable for stabilizing organic polymers.

The prior art is represented by such U.S. Pat. Nos. as 3,057,928; 3,210,428; 3,275,597; 3,354,118; and 4,132,702; and Belgium Patent No. 652,510.

3. Related Copending Patent Applications (a) Ser. No. 062,762 filed Aug. 1, 1979, describes and claims intermediate compounds used in making the compounds of this invention.

(b) Ser. No. 062,763 filed Aug. 1, 1979, describes and claims a method of making the intermediate compounds and the compounds of this invention.

SUMMARY OF THE INVENTION

This invention describes novel antioxidant compounds which are esters of ω,ω-bis (dialkylhydroxyphenyl) alkanols having the formula:

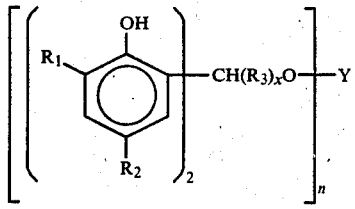

wherein $R_1$ is a tertiary alkyl group having 4–8 carbon atoms;
$R_2$ is alkyl having 1–4 carbon atoms;
$R_3$ is a straight chain or branched alkylene group having 1–4 carbon atoms;
x is 1–4,
n is 1 or 2, and,
Y is a group of the formulas

when n is 1, where $R_4$ is alkyl having from 12 to 24 carbon atoms, phenyl, or phenyl substituted with hydroxy or alkyl having 1 to 4 carbon atoms, or combinations thereof, or

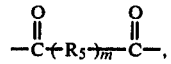

when n is 2, where $R_5$ is a direct bond, a straight chain or branched alkylene having 1 to 8 carbon atoms, a phenylene group, and, m is 0 to 4.

The new compounds of the invention are incorporated into an organic composition of matter to provide excellent protection against thermo-oxidative degradation, even after prolonged exposure to air and light.

DETAILED DESCRIPTION OF THE INVENTION

The ester compounds of the invention are made by esterification of the corresponding alkanol intermediates with a suitable acid or derivative thereof. The alcohols are synthesized by condensation of a suitable substituted phenol with a hydroxyaldehyde or precurser thereof in the following manner.

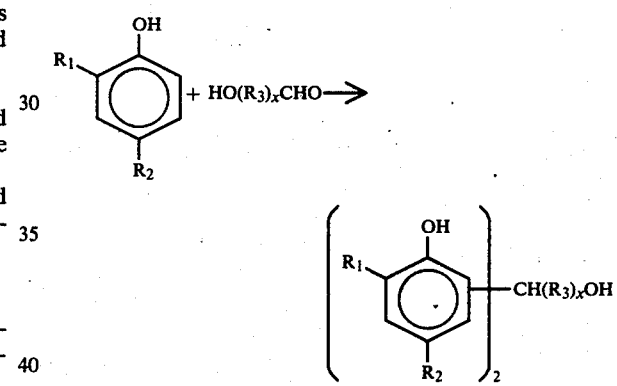

where $R_1$, $R_2$, $R_3$ and x are as defined above.

Generally the phenol and hydroxyaldehyde starting materials are commercially available, or may be readily synthesized by known methods in preparative organic chemistry. Typical $R_1$ groups include tert. butyl and diisobutyl; $R_2$ is methyl, ethyl, propyl, butyl, t-butyl; $R_3$ is propylene; and x is 1–4.

The hydroxyaldehyde starting material also may be made in situ from a suitable furan compound, for example, 2,3-dihydrofuran, which is made by 1,4-butenediol by dehydration and isomerization, as is known in the art. The furan compound, in acid solution, affords the desired γ-hydroxybutyaldehyde starting material.

The condensation usually is carried out without solvent at a temperature of about 25° to 75° C., preferably about 55° C., for about ½-3 hours, preferably an hour. The excess phenolic reactant then is distilled off and the product crystallized.

The esterification reaction is carried out in usual manner with an acid, acid halide, etc. to provide the desired ester. Both mono- and dicarboxylic acids may be used.

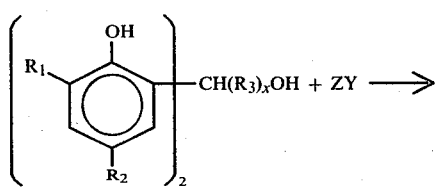

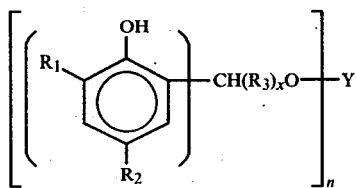

where $R_1$, $R_2$, $R_3$, x, Y and n are as defined above and Z is hydroxyl or a halide.

Examples of vinyl polymers which may be protected against oxidative degradation by this invention include: polyolefins such as poly(ethylene), poly(propylene), poly(butene-1), poly(pentene-1), poly(3-methylbutene-1), poly(hexene-1), copolymers of these olefin monomers such as poly(ethylene copropylene), and polymers from other polymerizable liquid ethylenically unsaturated monomers.

Examples of elastomers which may be protected against oxidation include natural rubber, EPT rubber, methyl rubber, SBR rubber, GR-s rubber, GR-n rubber, polybutadiene, cis-1,4-polyisoprene, neoprene, butyl rubber, nitrile rubber, and chloroprene.

Plastics which may be protected against oxidation include poly(styrene), poly(methyl styrene), poly(acrylates), poly(methyl acrylates), poly(ethyl acrylates), polyphenylene oxide, polysulfones, polyimides, polyamides, polybenzimidazoles, poly(acrylonitrile), poly(vinylchloride), poly(vinylacetate), poly(ethylene oxide), poly(methyl vinyl ether).

Fats and oils which can be protected include: Menhaden oil, cod liver oil, safflower oil, castor oil, olive oil, sesame oil, peanut oil, babassu oil, palm oil, corn oil, oleomargarine, lard, butter, beef tallow, animal fat and hydrogenated shortening products such as Spry, Crisco, and Snowdrift.

Synthetic lubricants which can be protected include alkyl oxalates, malonates, succinates, glutarates, adipates, pimelates, suberates, azelates, sebacates, esters from polyols such as pentaerythritol, trimethylol propane, and sorbitol, alkyl esters of aliphatic monocarboxylic acids such as lauric, oleic, palmitic, stearic and behenic.

Other lubricants include silicone lubricants such as polysiloxane oils and greases of the type polyalkyl-, polyaryl, polyalkoxy, polyaryloxy such as polydimethoxyphenoxy siloxane, silicate ester oils such as tetraalkyloxy and tetraaryloxysilanes, and halogen substituted siloxanes.

Fluocarbon lubricants such as $(CF_2CFCl)_n$, where n=an integer.

Polyalkylene glycol lubricants such as ethylene oxide-propylene oxide copolymers.

Phosphate esters such as

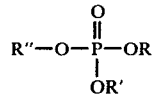

R, R' and R'' represent, hydrogen, phenyl, alkylphenyl, or an alkyl radical such as butyl, octyl, lauryl, oleyl or palmityl.

Other lubricants include synthetic base greases formed by mixing a soap with an oil, soaps derived from animal, vegetable fats, fatty acids, wood grease, rosin or petroleum acids, e.g. lead oleate, lithium stearate.

Other lubricants which can be protected by the composition of this invention include:

Hydraulic fluid and lubricants, industrial oils, automatic transmission fluids, (or simply) transmission fluids, crankcase lubricating oils, transformer oils, turbine oils, cutting oils, gear oils, white oils, glass annealing oils, and hydrocarbon waxes may also be protected.

Fuels which may be protected by this invention include gasoline, jet fuel, diesel fuel, kerosine, and fuel oil.

EXAMPLE 1

Preparation of 4,4-di (2-hydroxy-3-t-butyl-5-methylphenyl) butanol

To:

123.0 g. (0.75 mole) of 2-t-butyl-4-methylphenol and 75 g. of concentrated hydrochloric acid (37%) (under nitrogen was added over a 45 minute period at 53°–56°

17.5 g. (0.25 mole) 2,3-dihydrofuran. Approximately 15 minutes after addition was complete the reaction mixture solidified making stirring impossible. Ether was added to dissolve the solid and the reaction product washed with water and concentrated to 133 g. of residue. The excess 2-t-butyl-4-methylphenol was distilled off (40.0 g.) and the residue (75 g.) was crystallized three times from heptane, m.p. 132°–134°. The yield was 59.0 g. (59%). The infrared showed bands at 3610, 3480 and 860 cm$-^1$. The NMR showed a singlet in the aromatic region.

Anal. Calcd. for $C_{26}H_{38}O_3$: C, 78.34; H, 9.60; MW, 398.

Found: C, 77.61; H, 9.96; MW. 375.

EXAMPLE 2

Preparation of Terephthalate ester of 4,4-di(2-hydroxy-3-t-butyl-5-methylphenyl) butanol To:

20.0 g. (0.05 mole) of 4,4-di(2-hydroxy-3-t-butyl-5-methylphenyl) butanol, 5.0 g. (0.025 mole) terephthaloyl chloride and 200 ml. benzene, under nitrogen at 25°–35° was added 4.0 g. (0.05 mole of pyridine. The reaction was heated to 45°–55° for 5 hours, cooled and filtered. To the filtrate was added ether, washed with water and concentrated, yielding 20.5 g. of solid residue. The residue was crystallized three times from methanol yielding 8.4 g. (36%) mp. 148°–151°. Infrared showed bands at 3610, 3480 and 1710 cm$-^1$.

Anal. Calcd. for $C_{60}H_{78}O_8$: C, 77.72: H, 8.48. Found: C, 77.90; H, 8.37.

EXAMPLE 3

Preparation of Stearic ester of
4,4,-di(2-hydroxy-3-t-butyl-5-methylphenyl) butanol To:
14.2 g (0.05 mole) of stearic acid,
19.9 g. (0.05 mole) of 4,4-di(2-hydroxy-3-t-butyl-5-methylphenyl) butanol, and
200 ml of benzene was added
1.5 g of p-toluenesulfonic acid and the water azeotroped off. One millileter of water was collected. The product was washed with water dried over calcium chloride and concentrated. The residue weighed 30.4 g. It possessed hydroxyl and ester bands in the infrared.
Anal. Calcd. for $C_{44}H_{72}O_4$: C, 79.46; H, 10.91; MW. 665. Found: C, 79.32; H, 11.00; MW.555.

EXAMPLE 4

Esterification of
4,4-di(2-hydroxy-3-t-butyl-5-methylphenyl) butanol
with 3,5-di-t-butyl-4-hydroxybenzoyl chloride To:
13.4 g. (0.05 mole) of 3,5-di-tert-butyl-4-hydroxybenzoyl chloride,
19.9 g. (0.05 mole) of 4,4,-di(2-hydroxy-3-t-butyl-5-methylphenyl) butanol, and
200 ml. of benzene was added slowly
4.0 g. (0.05 mole) of pyridine. The reaction mixture was then heated to 78° for 4.5 hours. It was then cooled and filtered. The filtrate was washed with water, dried over sodium sulfate, filtered and concentrated yielding 27.3 g. (86%) of amber colored residue. The infrared exhibited bands at 3610, 3480, and 1690 cm$^{-1}$.
Anal. Calcd. for $C_{40}H_{58}O_5$: C, 78.05; H, 9.27; MW.630. Found: C, 77.86; H, 9.16; W.544.

EXAMPLE 5

Preparation of
5,5-di(2-hydroxy-3-t-butyl-5-methylphenyl) pentanol

To:
246.0 g (1.5 mole) 2-t-butyl-p-cresol and
150.0 g of concentrated hydrochloric acid (37%) under nitrogen was added over a 30 minute period at 55°-60°
51.0 g (0.5 mole) of 5-hydroxypentanal. The temperature was maintained for 5 hours. The reaction mixture was diluted with ether washed with water, dried over sodium sulfate and concentrated to 225.0 g. Excess 2-t-butyl-p-cresol was distilled off (72.1 g.) leaving 108.0 g. of residue. The oil had infrared bands at 3340 and 3500 cm$^{-1}$. It was transparent in the aldehyde region.
Anal. Calcd. for $C_{27}H_{40}O_3$: C, 78.59; H, 9.77. Found: C, 77.32; H, 9.23.

EXAMPLE 6

Preparation of Terephthalate ester of
5,5-di(2-hydroxy-3-t-butyl-5-methylphenyl) pentanol The reaction was carried out according to the method for Example 2 employing:
20.6 g (0.05 mole ) 5,5-di (-2-hydroxy-3-t-butyl-5-methylphenyl) pentanol
5.0 g (0.025 mole) terephthaloyl chloride
200 ml. benzene and
4.0 g (0.05 mole) pyridine.

Yield: 11.6 g. viscous amber oil
Infrared: 340 cm$^{-1}$; 1725 cm$^{-1}$.

EXAMPLE 7

Preparation of 2-diisobutyl-4-methylphenol

To:
216.0 g (2.0 mole) p-cresol (freshly distilled) was added
12.0 g of gaseous boron trifluoride (bubbled in). Heat to 52° C. and added slowly over 1 hour. 220 (2.0 mole) diisobutylene. The reaction exothermed to 58° C. during addition. Hold reaction mixture at 55°-60° C. for 4 hours. Add:
80 ml water and separate the water layer; neutralize the oil layer with sodium hydroxide. The product was distilled yielding 88 g boiling between 100° and 170° at 0.5 to 1.0 mm of Hg. The infrared and nuclear magnetic resonance spectra agreed with the structure.
Anal. Calcd. for $C_{15}H_{24}O$: C, 81.92; H. 10.98. Found: C, 82.24; H. 10.82.

This compound was used as a starting materialto prepare the alcohol of Example 8.

EXAMPLE 8

Preparation of
4,4-di(2-hydroxy-3-diisobutyl-5-methylphenyl) butanol

To:
165.0 g (0.75 mole) of 2-diisobutyl-4-methylphenol and
75.0 g of concentrated hydrochloric acid (37%) under nitrogen was added over a 45 minute period at 50°-60° C.
17.5 g (0.25 mole) 2,3-dihydrofuran. Approximately 15 minutes after addition a solid mass formed. Ether was added and the product washed with water and concentrated. The excess phenol was removed by distillation. The residue was purified by crystallization from heptane. The off-white solid, formed in 60% yield, had an infrared and nuclear magnetic resonance in agreement with the structure.

EXAMPLE 9

Preparation of Stearate ester of
4,4(2-hydroxy-3-diisobutyl-5-methylphenyl)butanol To:
14.2 g (0.05 mole) stearic acid,
25.5 g (0.05 mole) 4,4(2-hydroxyl-4-diisobutyl-5-methyl phenyl) butanol and
200 ml benzene was added
1.5 g p-toluenesulfonic acid. The water formed from the reaction was azeotroped off. 1 ml. was collected in a Dean-starke trap. The residue (34 g) possessed the proper ester absorption in the infrared.

EXAMPLE 10

Preparation of 2,2-di
(2-hydroxy-3-t-butyl-5-methylphenyl) ethanol

To:
246.0 g (1.5 mole) 2-t-butyl-p-cresol and
150.0 g concentrated hydrochloric acid (37%) under nitrogen was added over a 30 minute period at 55°-60° C.
30.0 g (0.5 mole) glycolaldehyde. The temperature was maintained for 6 hours. The reaction mixture was diluted with ether, washed with water, dried over sodium sulfate, and concentrated to 220.0 g. Excess 2-t-butyl-p-cresol was distilled off leaving 150 g. of residue. The material had hindered hydroxyl absorption at 3340 and 3500 cm$^{-1}$, and was transparent in the aldehyde region.

EXAMPLE 11

Preparation of Dodecanoate ester of 2,2-di(hydroxy-3-t-butyl-5-methyl-phenyl)ethanol To:
10.0 g (0.005 mole) dodecanoic acid,
18.5 g (0.05 mole) 2,2-di (2 hydroxy-3-t-butyl-5-methyl phenyl) ethanol and
200 ml benzene was added
1.5 g p-toluenesulfonic acid. The water of the reaction was zeotroped out (1 ml.) leaving 14 g. of residue after concentration. The infrared and nuclear magnetic resonance spectra agreed with the structure.

EXAMPLE 12

Preparation of 2,2-dimethyl-3,3-di(2-hydroxy-3-t-butyl-5-methyl-phenyl)propanol

To:
246.0 g (1.5 mole) 2-t-butyl-p-cresol and
150.0 g concentrated hydrochloric acid (37%) under nitrogen was added over a 30 minute period at 55°–60°.
51.0 g (0.5 mole) 2,2-dimethylhyd crylaldehyde. The temperature was maintained for 6 hours. After dilution with ether, the material was washed with water. The excess phenol was removed by distillation, leaving an off-white solid in 50% yield. The infrared and nuclear magnetic resonance agreed with the structure.

EXAMPLE 13

Esterification of 2,2-dimethyl-33-di(2-hydroxy-3-t-butyl-5-methylphenyl) propanol with stearic acid To:
14.2 g (0.05 mole) stearic acid,
20.6 g (0.05 mole) 2,2-dimethyl-3,3-di(2-hydroxy 3-t-butyl-5-methylphenyl) propanol
200 ml benzene was added
2.5 g p-toluenesulfonic acid. Water is azeotroped off (1 ml.) to yield 29 g of product after concentration. The product exhibited the ester carbonyl group in the infrared.

EXAMPLE 14

Esterification of 4,4-di(2-hydroxy-3-t-butyl-5-methylphenyl) butanol with succinoyl chloride To:
7.7 g (0.05 mole) succinoyl chloride, 19.9 g(0.05 mole) 4,4-di (2-hydroxy-3-t-butyl-5-methylphenyl) butanol and
200 ml benzene was added slowly
4.0 g (0.05 mole) of pyridine. Heated to 75°–80° and held for 6 hours. Cooled and filtered the pyridine hydrochloride. Concentration yielded 24 g of the ester. The infrared and nuclear magnetic resonance agreed with the structure.

EXAMPLE 15

To illustrate the unusual antioxidant effect of the products of this invention in protecting polymers, the standard oven oxidation test with polypropylene was used.

The antioxidant system was compounded into unstabilized polypropylene on a Banbury type laboratory mill (Brabender Plastograph) at 183° C. for 10 minutes. A 40 mil. thick sheet of compounded material was compression molded on a laboratory press (Carver) using 245° C. platen temperatures, 10,000 lbs. pressure on the 2¼ inch diameter ram, and a dwell time of 2 minutes. The sheets were air cooled under pressure before removal from the press. Standard microdumbell specimens (ASTM D 1708-59T) were die cut from the sheet. No discoloration was noted in the specimen. The specimens were suspended vertically in an air circulating oven operating at 300° F. Time to initial failure is noted as the exposure time required for first signs of microcracking or crazing of specimen. Time to final failure was noted as the exposure time required to produce breaking of the specimen when flicked with the finger.

The antioxidant properties of representative compounds of the invention are summarized in the following table:

| Effect of Additive on Polypropylene | | |
|---|---|---|
|  | Concentration(phr) | Hours to Failure |
| Polypropylene |  | 2 |
| Alcohol of Example 1 | 0.5 | 58–82 |
| Ester of Example 2 | 0.5 | 850–922 |
| Ester of Example 3 | 0.5 | 479–491 |
| Ester of Example 4 | 0.5 | 925–950 |

What is claimed is:

1. A compound of the formula:

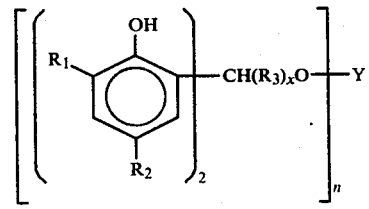

wherein
R$_1$ is a tertiary alkyl group having 4–8 carbon atoms;
R$_2$ is alkyl having 1–4 carbon atoms;
R$_3$ is a straight chain or branched alkylene group having a 1–4 carbon atoms;
x is 1–4,
n is 1 or 2, and,
Y is a group of the formulas

when n is 1, where R$_4$ is alkyl having from 12 to 24 carbon atoms, phenyl, or phenyl substituted with hydroxy or alkyl having 1 to 4 carbon atoms, or combinations thereof, or

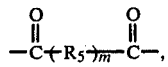

when n is 2, where $R_5$ is a direct bond, a straight chain or branched alkylene having 1 to 8 carbon atoms, a phenylene group, and, m is 0 to 4.

2. A compound of claim 1 wherein $R_1$ is tertbutyl.
3. A compound of claim 1 wherein $R_1$ is diisobutyl.
4. A compound; of claim 1 wherein $R_2$ is methyl.
5. A compound of claim 1 wherein $R_3$ is a straight chain alkylene group.
6. A compound of claim 1 wherein $R_3$ is a branched alkylene group.
7. A compound of claim 1 wherein x is 3.
8. A compound of claim 1 wherein x is 4.
9. A compound of claim 1 wherein n is 1.
10. A compound of claim 1 wherein n is 2.
11. A compound of claim 1 wherein $R_4$ is a straight chain alkyl group having 12 carbon atoms.
12. A compound of claim 1 wherein $R_4$ is a straight chain alkyl group having 24 carbon atoms.
13. A compound of claim 1 wherein $R_4$ is a phenyl group.
14. A compound of claim 1 wherein $R_4$ is phenyl substituted with hydroxy.
15. A compound of claim 1 wherein $R_4$ is phenyl substituted with alkyl having 1 to 4 carbon atoms.
16. A compound of claim 1 wherein $R_4$ is phenyl substituted with hydroxy and alkyl.
17. A compound of claim 1 wherein $R_5$ is alkylene having 1 to 8 carbon atoms.
18. A compound of claim 1 wherein $R_5$ is phenylene.
19. A compound of claim 1 wherein $R_5$ is a direct bond.
20. A compound of claim 1 wherein $R_5$ is phenylene substituted with hydroxy or alkyl having 1 to 4 carbon atoms.
21. A compound of claim 1 wherein m is 3 or 4.
22. A compound of claim 1 which is the terephthalate ester of 4,4-di(2-hydroxy-3-t-butyl-5-methylphenyl) butanol.
23. A compound of claim 1 which is the stearic ester of 4,4-di(2-hydroxy-3-t-butyl-5-methylphenyl).
24. A compound of claim 1 which is the 3,5-di-t-butyl-4-hydroxybenzoate of 4,4-di(2-hydroxy-3-t-butyl-5-methylphenyl) butanol.
25. A compound of claim 1 which is terephthalate ester of 5,5-di(2-hydroxy-3-t-butyl-5-methylphenyl) pentanol.
26. A compound of claim 1 which is stearate ester of 4,4(2-hydroxy-3-diisobutyl-5-methylphenyl) butanol.
27. A compound of claim 1 which is dodecanoate ester of 2,2-di(2-hydroxy-3-t-butyl-5-methyl-phenyl) ethanol.
28. A compound of claim 1 which is 2,2-dimethyl-3,3-di(2-hydroxy-3-t-butyl-5-methylphenyl) propanol with stearic acid.
29. A compound of claim 1 which is 4,4-di(2-hydroxy-4-t-butyl-5-methylphenyl) butanol with succinoyl chloride.
30. An organic composition of matter stabilized against thermo-oxidative degradation by incorporating therein a stabilizer of claim 1.
31. A composition of claim 30 wherein said organic material is a polymer.
32. A composition of claim 30 wherein said polymer is a polyolefin.
33. A composition of matter according to claim 30 wherein said polyolefin is polypropylene.
34. A polypropylene composition stabilized with a compound of claim 22.
35. A polypropylene composition stabilized with a compound of claim 23.
36. A polypropylene composition stabilized with a compound of claim 24.
37. A polypropylene composition stabilized with a compound of claim 25.
38. An o rganic composition of matter stabilized against thermo-oxidative degradation by incorporating therein a stabilizer of claim 22.
39. An organic composition of matter stabilized against thermo-oxidative degradation by incorporating therein a stabilizer of claim 23.

* * * * *